Feb. 24, 1959   J. C. ALGER   2,874,561
HUB CAP LOCK
Filed Nov. 25, 1957

INVENTOR.
James C. Alger
BY
Att'y

United States Patent Office 2,874,561
Patented Feb. 24, 1959

2,874,561

HUB CAP LOCK

James C. Alger, San Francisco, Calif.

Application November 25, 1957, Serial No. 698,580

2 Claims. (Cl. 70—169)

This invention relates to improvements in hub cap locks. The principal object of this invention is to provide means for locking the ordinary hub cap to the wheel of a vehicle so that unauthorized persons cannot remove the cap.

A further object is to produce a device of this character which may be readily attached to any standard form of wheel and hub cap without materially altering its construction.

A still further object is to produce a device of this character which is economical to manufacture, and one which is easy to apply.

Other objects and advantages will be apparent during the course of the following description.

In the accompanying drawings forming a part of this specification and in which like numbers are employed to designate like parts throughout the same, Fig. 1 is a side elevation of a wheel having my invention applied thereto;

Figure 1:
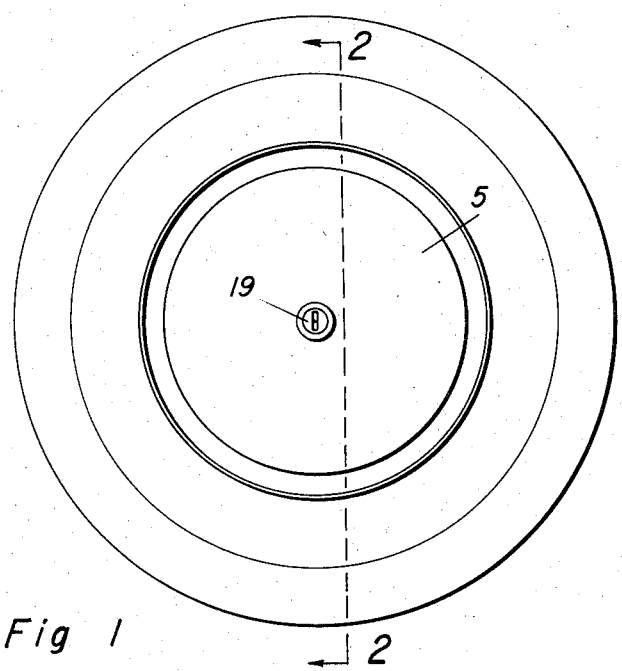

Owners of cars are presently suffering considerable loss through the stealing of hub caps and in some instances these losses have been transferred to insurance companies.

Applicant has therefore devised a simple arrangement which may be attached to the wheel bolts of an ordinary wheel and which will cooperate with a lock and movable hasp carried by the hub cap.

In the accompanying drawings, wherein for the purpose of illustration is shown a preferred embodiment of my invention, the numeral 5 designates a hub cap which is normally attached to a wheel 6 by clips 7. The wheel 6 is attached to a brake drum or wheel support 8 by a plurality of bolts, two of which are shown at 9, upon which nuts 11 are threaded.

My invention consists in forming a wire member 12 having looped ends 13 and 14 which are adapted to engage two of the bolts 9 and to be held thereon by the nuts 11. This wire member 12 has an offset portion 16 from which projects a U-shaped portion 17 adapted to be engaged by a hasp 18 projecting from a lock body 19 carried in the hub cap 5.

The lock body 19 has a semi-circular disc 21 secured thereto, the purpose of which will be later seen.

Figure 2:
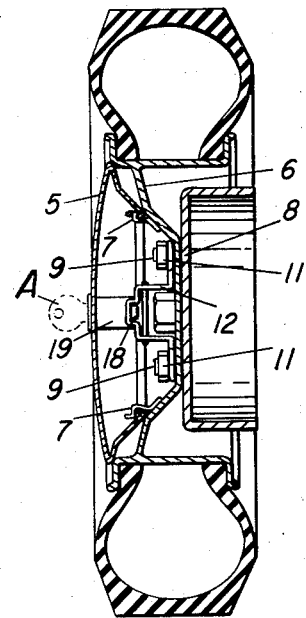
Fig. 2 is a cross-sectional view taken on line 2—2 of Fig. 1 and showing portions thereof in cross-section.
Figure 3:
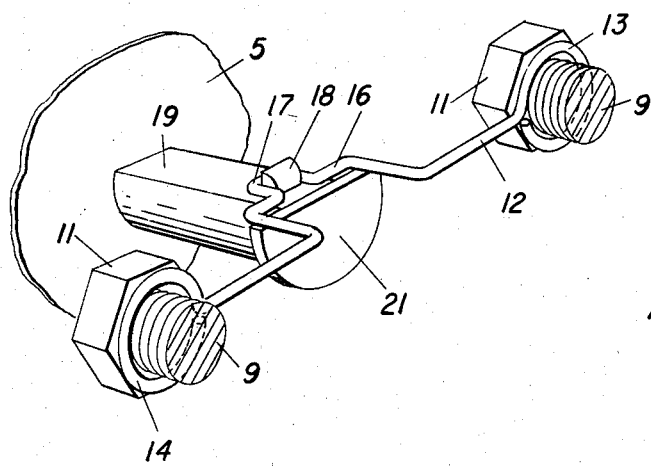
Fig. 3 is an enlarged, fragmentary perspective view showing the locking wire as the same would be positioned on the wheel bolts and engaged by the lock.
Figure 4:
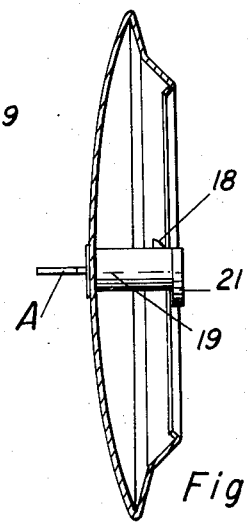
Fig. 4 is a cross-sectional view of a hub cap having my invention applied thereto.

When the parts are arranged as shown in Figs. 2 and 3, it is necessary only to rotate the hub cap until the flat top of the disc 21 will pass beneath the offset 16 and to then force the hub cap inwardly until it is engaged by the spring clips 7, at which time the hasp 18 will be first depressed and then released at a point within the U-shaped member 17, thus locking the hub cap to the wheel.

Due to the arrangement of the disc underlying the offset portion 16, it is impossible for a person to twist the hub cap with respect to the wire 12. It is therefore impossible to remove the hub cap without the use of a key, as shown in dotted lines at A.

It will thus be seen that my invention accomplishes all of the objects above set forth. It is to be understood that the form of my invention herewith shown and described is to be taken as a preferred example of the same and that various changes relative to the material, size, shape and arrangement of parts may be resorted to without departing from the spirit of the invention or the scope of the subjoined claims.

Having thus described my invention, I claim:

1. A hub cap lock for a vehicle wheel comprising a wire member having loops formed thereon for engagement with the retaining bolts of a wheel, an offset portion formed in said wire member and extending outwardly from the wheel, a U-shaped portion formed in said offset portion, a lock body carried by the hub cap and having a spring projected hasp, said lock body being arranged to underlie said offset portion with the spring projected hasp receivable in said U-shaped portion of the offset portion for retaining the hub cap on the wheel and, a semi-circular disc secured to the lock body and adapted to have its flat edge underlie said offset portion.

2. In combination with a wheel, retaining bolts for said wheel and a hub cap for said wheel, of a wire member having its ends bent to form loops for engagement with two of said retaining bolts, a hasp-bearing lock body secured to said hub cap and having its free end underlying said wire member, a semi-circular disc carried by the free end of said lock body, said wire member being bent to form an offset, and a hasp engaging portion, and adapted to overlie said lock body and the flat edge of said semi-circular disc, said hasp engaging portion of said wire member being engaged by the hasp borne by said lock body.

References Cited in the file of this patent

UNITED STATES PATENTS 2,535,126    Flowers et al. _____ Dec. 29, 1950